May 5, 1970　　　A. V. FRAIOLI　　　3,509,583
ELECTRO-MECHANICAL HAND HAVING TACTILE SENSING MEANS
Filed Sept. 9, 1965　　　2 Sheets-Sheet 1

SENSOR OUTPUT VS. STRESS

TACTILE SENSING ELEMENT

CONTROL AND FEEDBACK CIRCUIT

INVENTOR.
ANTHONY V. FRAIOLI
BY
Constantine A. Michalos
ATTORNEY

TACTILE MANIPULATOR

United States Patent Office 3,509,583
Patented May 5, 1970

3,509,583
ELECTRO-MECHANICAL HAND HAVING
TACTILE SENSING MEANS
Anthony V. Fraioli, Essex Fells, N.J., assignor to The
Bendix Corporation, a corporation of Delaware
Filed Sept. 9, 1965, Ser. No. 486,069
Int. Cl. A61f 1/06
U.S. Cl. 3—1.1                                    15 Claims

ABSTRACT OF THE DISCLOSURE

An electro-mechanical hand having tactile sensors on links of finger elements of the hand, and motor means supported by inner adjacent links for pivotally driving outer links of the finger elements in response to pressures applied to the tactile sensors on the outer links.

---

This invention relates to manipulators and, more particularly, to a semiautomatic mechanical hand or prosthetic device utilizing piezo-diodes as pressure sensing means or tactile sensors, supported on a metallic structure comprised of interconnected hinged links coupled as to represent joints of the skeleton of the mechanical hand incorporated internally within flexible skin-like material.

Manipulators or mechanical hands or prosthetic hands utilize some form of controlled mobility to simulate useful actions, as in the maneuvering of an actual human hand.

Information is limited as to the functional evaluation in the attempts made to synthesize human motor functions, however, prosthetic devices have been provided with sensors which control the pressure exerted by an artificial hand so as not to squeeze an egg or a glass to the breaking point.

Heretofore, mechanical hands utilized on-linear carbon-powder pressure transducers as sensors. In addition, the mechanical hands utilized cables, apparently drum-wound by a servomotor, to actuate the fingers. The fingers were not individually controlled but were spring loaded which permitted only light manipulation. With a given spring constant, a practical range of holding capability has not heretofore been obtainable. A manipulator capable of holding a drinking glass could not pick up heavy objects without damage to the springs. In addition, individual digit control could not be accomplished.

This invention provides for small sized piezo-diode directly implanted in a load-supporting region of each joint of each finger or digit in a manipulator or artificial hand. Basically, this provides both sensing and lifting control of an article to be grasped and removed from its stationary position.

When utilized in space, radiation environment, or prosthetic applications, this remote control manipulator or mechanical hand will provide a sense of touch which will permit semiautomatic operation of the manipulator or hand. The sense utilized in this manipulator when used in this fashion may be termed tactile sense.

Therefore, an object of this invention is to provide an improved manipulator for more efficiently operating as a human hand.

Another object of this invention is to provide a semiautomatic solid state sensing and actuating manipulator which can operate in a highly accurate manner by having means of sensing and load supporting means within the area of contact with an article to be grasped.

Another object of this invention is to provide a semiautomatic mechanical manipulator or prosthetic hand wherein each joint of the finger constituting the hand can come in contact upon the surface of the object to be grasped in a manner so that all of the pads of the joints make contact with the contour of the object.

A further object of this invention is to provide a manipulator or artificial hand which can semiautomatically grasp odd shaped articles of varying fragility.

An additional object of this invention is to provide a tactile sensing incorporated with a feedback loop within drive mechanisms actuating individual joints in a mechanical manipulator or artificial hand which can impart a sense of touch and thereby control functions required by the operatior in grasping different articles.

These and other objects and features of the invention are pointed out in the following description in terms of the embodiment thereof which is shown in the accompanying drawing. It is to be understood, however, that the drawing is for the purpose of illustration only and is not a definition of the limits of the invention, reference being had to the appended claims for this purpose.

Figure 1:
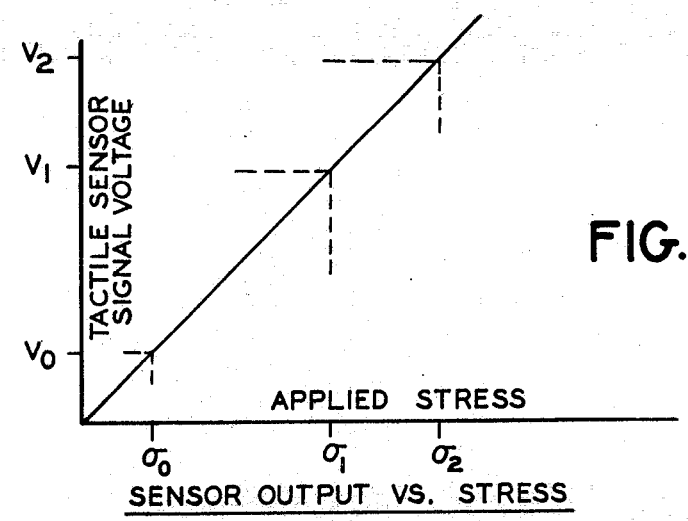
FIGURE 1 shows a graph indicating a linear relationship between applied stress and breakdown voltage of a piezo-diode utilized within the invention.

Referring to the drawing of FIGURE 1, there is shown the linear variation of the tactile sensor signal voltage in relation to the applied stress or force produced on the sensor. The sensor output versus stress curve shows that if the stress applied is increased from $\sigma_1$ to $\sigma_2$ the voltage will be increased from $V_1$ to $V_2$.

Figure 2:
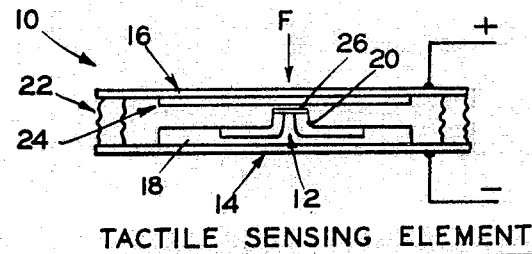
FIGURE 2 shows an enlarged detailed fragmentary schematic view of a piezo-diode tactile sensing element.

FIGURE 2 shows a cross sectional view of tactile sensing element 10, more specifically described and claimed in a U.S. Patent No. 3,323,358, granted June 6, 1967 to Anthony V. Fraioli the inventor of the present invention, and assigned to The Bendix Corporation, assignee of the present invention.

Tactile sensing element 10 is comprised of a P-type silicon material 12 sandwiched between a molybdenum base plate 14 and an upper molybdenum plate 16. This basic transducer is a mesa piezo-diode fused in a gold-gallium alloy 18 mounted onto the molybdenum base plate 14. An N-type guard ring 20 surrounds the mesa and need not penetrate the silicon material 12 since the entire molybdenum base plate 14 is in electrical contact with the P region of the sensor and is held in electrical isolation from the upper molybdenum plate 16 by an elastomeric or fixed hermetic seal 22. Here again, N-type silicon plate or disc 24 is fusion sealed by a material such as gold-antimony alloy to the upper molybdenum plate 16. The N-type silicon disc 24 provides ohmic contact to an N-type region of a shallow PN junction 26 on the upper surface of the mesa.

It will also be apparent to those skilled in the art that a structure inverted to that described above wherein P-type material is replaced by N-type material and vice versa will result in a functioning device when the polarity is reversed.

In lieu of the silcon probe, a less hard probe-disc of tool steel or sintered tungsten carbide may be brazed to the upper molybdenum plate 16 to provide ohmic contact to the N+ region of the diode.

Figure 4:
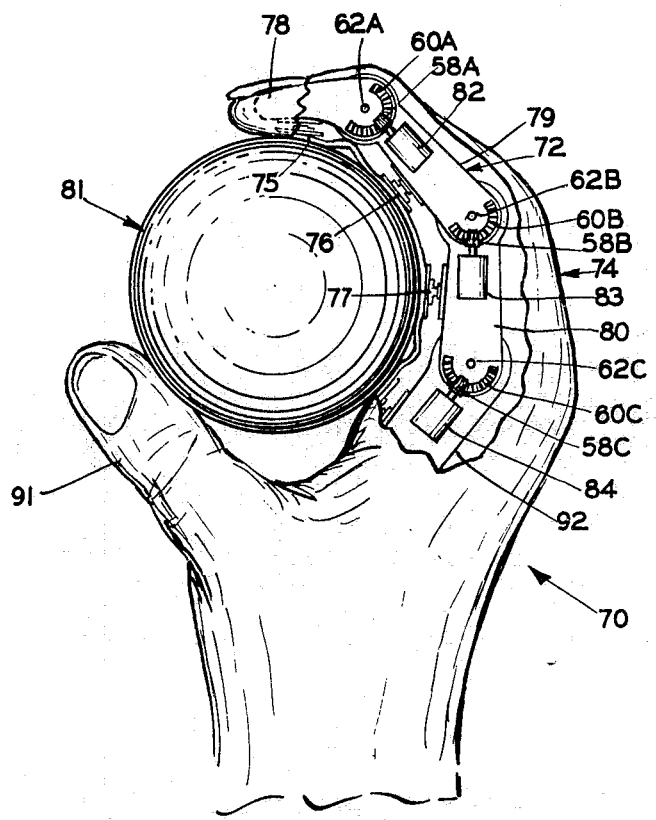
FIGURE 4 shows the actual mechanical hand in its operation of holding a round object.

Referring generally to the drawing of FIGURE 4, the mechanical hand may be articulated in the finger portions thereof to provide for pivotal movement of outer, inner and intermediate links of each finger portion in which each such link is connected to its associated link by a pivotal joint connection.

Amplification of an applied pressure may be achieved by varying the area of the upper molybdenum plate 16 upon which a force F can be applied. The variation of area may be from $4.4 \times 10^{-5}$ cm.$^2$ which is the area of the piezo-diode mesa supporting the upper plate 16 to approximately 2 cm.$^2$ which is roughly the contact area available on each link of each finger portion of the mechanical hand and which limits the area of the upper molybdenum plate.

More specifically, the pressure transducer or piezo diode tactile sensor is constructed of the two circular wafers 18 and 24. This pressure transducer is more specifically described and claimed in the U.S. Patent No. 3,323,358. The amplification of the applied pressure may be achieved by varying the area of the upper molybdenum plate 16 upon which the force F has been applied as hereinbefore explained. This is roughly the contact area available on each link of each finger portion of the mechanical hand as shown in FIGURE 4 which relates the area of the upper molybdenum plate 16.

Figure 3:
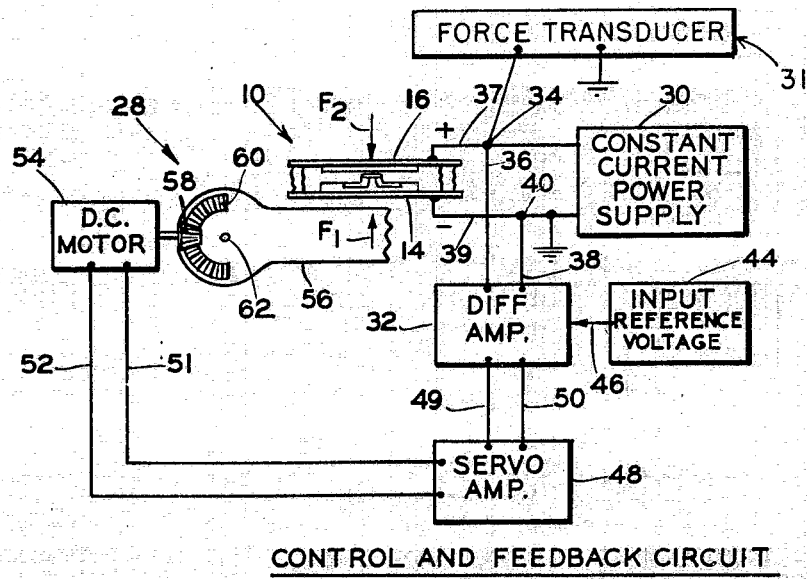
FIGURE 3 shows the electrical circuitry operably connected to one link of one digit of the mechanical manipulator utilized in this invention.

Before describing the mechanical hand shown in FIGURE 4, the control and feedback circuitry of FIGURE 3 is shown comprised of one link 28 of a finger portion shown in FIGURE 4. This circuitry provides the mechanical hand with a capability of grasping irregular shaped objects with a predetermined firmness of grip and of distributing the load evenly to all digits of the hand as best shown in FIGURE 4. The circuit is simplified in that it shows one piezo diode tactile sensor controlling one link of one digit. The circuit employs the above-described piezo diode tactile sensor 10, a constant current power supply 30, an operator-operative force transducer 31 for selectively superimposing a voltage control signal of a $V_2$ volts magnitude on all the piezo diode tactile sensors outputs, as hereinafter explained, and a differential amplifier 32. The differential amplifier 32 is connected to the constant current power supply 30 by line conductors 36 and 38, and to the upper molybdenum plate 16 at a junction 34 through a line conductor 37 and to the lower molybdenum plate 14 at a junction 40 by a line conductor 39.

As shown, the constant power supply 30, in addition to its being connected to the differential amplifier 32, is also connected to the lower plate 14 of the sensor 10 at the junction 40 and to the upper plate 16 at junction 34.

In addition, there is provided a source of variable input reference or bias voltage 44 connected as shown by arrow 46 to the amplifier 32. In addition, the differential amplifier 32 is connected to a servo amplifier 48 by line conductors 49 and 50. The servo amplifier 48 is connected by line conductors 51 and 52 to drive an actuator such as a bi-directional solenoid or direct current motor 54 in a direction dependent upon the polarity sense of the resultant differential voltage applied across the output of the differential amplifier 32.

Illustrating the motor embodiment, the link 28 of the finger portion of the mechanical hand is comprised of a structural member 56 mechanically coupled to the direct current motor 54 by a pinion gear 58 and a rack gear 60 provided on an inner portion of the link 28 and about a pivot pin 62. The structural member 56 pivots about a pivot pin 62 projecting from an outer end portion of an associate link of the finger portion of the mechanical hand. Thus the structural member or link 56 is connected at one end to the rack and pinion 60 and 58 and at the other end extends adjacent the piezo diode tactile sensor 10, which in turn connects the closed loop circuitry by providing a balance reactant force $F_1$ against the sensor 10 to the load force $F_2$ applied by the grasped object as best shown in FIGURE 4.

Referring to FIGURE 4 of the drawing, there is shown a mechanical hand 70 comprised primarily of a frame having an interconnected hinged linked skeleton structure 72 enclosed in a polyethylene type material 74. The polyethylene 74 is cut away to expose the piezo diode tactile sensors 75, 76 and 77 which are connected respectively to an outer link 78, an intermediate link 79, and an inner link 80 and which in turn control pressure applied to a round object 81, as hereinafter more fully explained. Each such link is connected to its associated link by a pivotal joint connection or pins 62A, 62B and 62C, as shown in detail by FIGURE 4.

The piezo diode tactile sensors 75, 76, and 77 are electrically connected to motor 82, 83 and 84 respectively by circuitries similar tot hat shown in FIGURE 3. That is, the sensor 75 is electrically associated with the motor 82 and in the same manner, the sensor 76 is electrically associated with the motor 83 and the sensor 77 is electrically associated with the motor 84. In this respect each sensor 75, 76 and 77 are electrically connected to their respective motors 82, 83 and 84. These three sensors 75, 76 and 77, and motors 82, 83 and 84, control respectively the end link 78, the intermediate link 79, and the inner link 80 of one digit of the overall skeleton 72 of the hand 70.

It can be noted from FIGURE 4 that the direct current motors 82, 83 and 84 are supported on the links 79, 80 and 92 immediately preceding the associated links 78, 79 and 80 carrying the controlling piezo diode tactile sensors 75, 76 and 77. That is, the motor 82 is supported by the intermediate link 79 and drives the end link 78 about a pivot pin 62A through a rack 60A and a pinion 58A. The motor 83 is supported by the inner link 80 and drives the intermediate link 79 about a pivot pin 62B through a rack 60B and a pinion 58B. The motor 84 is supported by a link 92 on the frame within the inner portion of the hand 70 and drives the inner link 80 about a pivot pin 62C through rack 60C and pinion 58C. As herein described, each sensor, joint and motor combination of the skeletion 72 are mechanically geared and driven for pivotal rotation about pivots 62A, 62B and 62C.

In operation of the system, the device can be manipulated to actuate each joint by varying the input reference voltage to each of the differential amplifiers 32. That is, the equilibrium or rest forces $F_1$ which is applied by the joint of any digit or finger of the mechanical hand is a linear function of the variable input reference voltage. Specifically, when a force lower than the equilibrium force $F_1$ is applied by the pressure on the round object 81 by the piezo diode tactile sensor 75 shown in FIGURE 4, it will direct a signal to the motor 82 to rotate its pinion 58A in a direction to cause the link 78 to be forced downwardly against the object 81 to produce the equilibrium force $F_1$.

In this respect as shown in FIGURE 3, the constant current supply is adjusted to give a constant current through the piezo diode tactile sensor 10 in a direction and quantity as to reverse the bias of the piezo-diode in the avalanche mode. The potential developed by the supply is the reverse breakdown voltage of the diode. As force is applied, a uniaxial stress is developed in the diode due to the mesa and the flat-probe construction of the sensor. This will lower the reverse breakdown voltage, as brought out before in FIGURE 1 and as it is shown in the linear relationship between the applied stress $\sigma$ and the lowering of the reverse breakdown voltage, plotted in the positive value of this difference in the graph of FIGURE 1, and designated as the tactile sensor output voltage. This output voltage is fed as a signal voltage into the differential amplifier 32 where it is compared with the input reference voltage, for example, $V_1$ volts.

The differential voltage of either polarity is fed into the direct current servo amplifier 48 where it emerges amplified to drive the motor or solenoid 54 in a direction indicated by the polarity. This adjusts the stress $\sigma$ on the sensor at a point where the output signal voltage is equal to the sample or reference voltage $V_1$. This will provide zero output from the differential amplifier and the motor will stop. Actually, the motor drive voltage from the servo amplifier will be a linear function of the degree of "off-balance," and as such will provide the proportional control. Thus, by varying the input reference voltage to the differential amplifier 32 to any value between $V_0$ to $V_2$ the tactile sensor 10 will provide feedback control to maintain the sensor stress to any value between the unloaded stress $\sigma_0$ and the overloaded stress $\sigma_2$.

Semiautomatic operation of the mechanical hand shown in FIGURE 4 may be visualized if one considers the piezo diode tactile sensors 75, 76 and 77 as the sensitive portions of the inner surface of each finger. The actual human hand in sensing an object within its grasp will curl up to grasp the object with enough force as to lift it, still holding it so that it will not fall. In this respect, as the mechanical piezo diode tactile sensors 75, 76 and 77 sense an object, they will drive the motors 82, 83 and 84 in a direction whereby the links 78, 79 and 80 will curl inwardly about the object to grasp it. This cycle is initiated with the digits of the hand fully extending.

A thumb 91 also has two joints, both controlled by a piezo diode tactile sensor and motor means as provided in the other fingers. When the arm of the mechanical manipulator is extended, the thumb is also positioned so that it can swing in a line with the forefinger on closing.

On initiation of the cycle, each piezo diode tactile sensor 75, 76 and 77 of each digit and the piezo diode tactile sensors within the thumb 91 will sense an unloaded stress $\sigma_0$ and will transmit a control signal voltage of $V_0$ volts. Thereupon the input reference voltage supplied by source 44 to the differential amplifier 32 will effect a differential output voltage to cause the motors to actuate the finger linkages in a sense to provide a closing of the hand about the object 81. As the fingers close about the object 81 which may be a ball, a wrench handle, a glass, or an egg, a wrap-around action ensues until the pad of each digital link, in which there is a sensor, makes contact with the surface of the grasped object. This will provide support sufficient to emit a signal voltage of $V_1$ magnitude from the piezo diode tactile sensor. If the contour of the surface of the grasped object is such that the forward link of any digit, such as link 78, supports its equilibrium load before the pads of the two posterior links, such as links 79 and 80, of the same digit have supported theirs, the forward link will back off as its piezo diode tactile sensors read $\sigma_2$ or any stress greater than the equilibrium stress $\sigma_1$ since this forward piezo diode tactile sensor is stressed by the closing of the last two links and transmits a voltage of $V_2$ volts, a back-off signal. Again, the rate of stress removal depends on the stress overload or the difference between the actual stress being sensed $\sigma_2$ and the equilibrium stress $\sigma_1$, or $\sigma_2-\sigma_1$. Contour permitting, the second and third links of those digit links 79 and 80 will close and make load supporting contact. Where the contour will not permit load support on a piezo diode tactile sensor of a posterior link, the link forward of it, having fully extended itself in the "backing-off" process, will still be driven to produce a piezo diode tactile sensor output of $V_2$ volts. This combination can provide a cut-out signal for the motors driving all the links of that digit.

When the grasping task is completed, the cycle may be completed by superimposing a voltage signal of a $V_2$ volts magnitude on all the piezo diode tactile sensor outputs. This signal may be produced by incorporating a force transducer 31 which is shown diagrammatically in FIGURE 3. The force transducer 31 may be selectively operated to apply an on-off signal voltage $V_2$ across the output of the sensor 10. The force transducer 31 is in a manner well known in the art operably coupled to the actuating muscles of the wearer of the mechanical hand to make it possible to direct an operator-operative controlled signal voltage $V_2$ across the input of the differential amplifier 32 in opposition to the reference voltage from source 44 so as to effect a resultant differential output signal voltage acting in a sense to cause the motor 54 to drive the pinion gear 58 in a direction to position the structural member 56 of a finger of the mechanical hand so as to release the grasped article. This will fully extend the digits and provide motor cut off as described above.

In regrasping the article, the cycle can be reinitiated by removing the externally applied voltage signal $V_2$ effected by the force transducer 31 and allowing the individual piezo diode tactile sensors to perform their functions in the feedback loop. It should be noted that only two control functions are required by the operator of such an artificial hand or mechanical manipulator, an on cycle and an off cycle effected by an operator-operative on-off cycle switch in the force transducer 31 and an operator-operative potentiometer adjusted in the reference source 44 for setting the reference voltage and thereby the firmness of grasp as regulated by the tactile sensors 10.

In summary therefore, this combination provides for a new type of a mechanical hand having digits with links, each link having a piezo diode tactile sensor which incorporates a feedback loop to drive mechanisms of the individual links in the finger portions of the mechanical hand which in a way can impart a "sense of touch." In addition, this invention provides for a manipulator or mechanical hand which performs semiautomatically the task of grasping odd shaped articles of varying fragility without destroying them.

What is claimed is:

1. A manipulator comprising a frame having a plurality of spaced pivotally interconnected hinged linkages having outer and inner links, individual sensors connected on the outer links for sensing an object, and individual motor means operably controlled by said sensors and supported by the inner adjacent links for pivotally driving said outer links relative to said inner links in a direction to maintain stresses applied to the sensors at an equilibrium upon said sensors of said outer links contacting the object.

2. A manipulator comprising a frame having a plurality of outer and inner linkages, each linkage having inner and outer end surfaces, means for pivotally interconnecting said linkages, individual sensors connected to the outer end surfaces of said outer linkages, individual motor means controlled by said sensors and supported on the inner linkages for actuating said outer linkages in a direction relative to said inner linkages to maintain stresses applied to the sensors at an equilibrum upon said sensors of said outer linkages contacting an object to be grasped, said sensors upon contacting the object to be grasped thereby causing said motor means to actuate the plurality of interconnected linkages so as to pivot towards the object to be grasped so as to make a wrap around contact with the contour of the object.

3. A mechanical hand comprising a frame having a plurality of spaced fingers, each finger including inner and outer links, each inner link being connected to an associated outer link by a pivotal joint connection, each link having inner and outer ends, individual tactile sensors operably connected to the outer ends of said outer links, individual driving means controlled by said sensors and supported by the inner adjacent links for actuating said outer links relative to said inner links, and means controlled by said tactile sensors in response to an unloaded stress for energizing said driving means in a sense for operably moving each of said outer links in one direction for simulating the closing of the hand, and said tactile sensors being responsive to a stress overload for controlling said last mentioned means for energizing said driving means in an opposite sense for operably moving each of said outer links in another direction for simulating the opening of the hand.

4. The combination defined by claim 3 in which said means for energizing said driving means is an electronic control and feedback circuitry including the tactile sensors in the control and feedback circuitry.

5. The combination defined by claim 3 including means for selectively controlling said means for energizing said driving means in said opposite sense for causing said driving means to operably move each of said outer links in said other direction for simulating the opening of the hand.

6. A mechanical hand comprising a frame having a plurality of fingers, each finger including inner and outer links, each inner link being connected to an associated outer link by a pivotal joint connection, each link having inner and outer ends, individual tactile sensors operably connected to the outer ends of said outer links, individual driving means controlled by said sensors and supported by the inner adjacent links for actuating said outer links relative to said inner links, said driving means including a motor, a constant current power supply having an output controlled by one of said sensors for controlling energization of said motor upon said sensor sensing an object to be grasped, a differential amplifier connected to the controlled output of said constant current power supply, and a servo amplifier connected to an output of said differential amplifier, said sensor controlling the energization of said motor to effect a bi-directional actuation of the outer link, and said motor being operably connected to an output of said servo amplifier for controlling the force being applied to said sensor by the actuation of the outer link.

7. A mechanical hand comprising a frame having a plurality of fingers, each finger including inner and outer links, each inner link being connected to an associated outer link by a pivotal joint connection, each link having inner and outer ends, individual tactile sensors operably connected to the outer ends of said outer links, individual driving means controlled by said sensors and supported by the inner adjacent links for actuating said outer links relative to said inner links, the outer ends of each link including a pad, each of said sensors being interposed and supported between the outer ends of each link and said pads, and each sensor including a piezo-diode having one surface supported by the outer end of each link and the other surface supported by the pad and operably extended for contacting an object to be grasped.

8. A mechanical hand comprising a frame having a plurality of fingers, each finger including inner and outer links, each inner link being connected to an associated outer link by a pivotal joint connection, each link having inner and outer ends, individual tactile sensors operably connected to the outer ends of said outer links, individual driving means controlled by said sensors and supported by the inner adjacent links for actuating said outer links relative to said inner links, said sensors to provide a voltage output linear with the applied stress to the outer ends of said outer links to cause energization of the driving means in one sense to actuate the links in one direction, and wherein an inbalance stress will cause said sensors to provide a restoring voltage signal in an opposite sense to cause energization of said driving means so as to effect actuation of the outer links in an opposite direction proportional to the amount of inbalance.

9. A semiautomatic sensing and actuating manipulator comprising a frame having an interconnected hinged linked structure, a first link, a tactile sensor supported at one end portion of said first link, a second link, actuator means supported by said second link and electrically controlled by the tactile sensor, coupling means interconnecting said first and second links and operably driven by said actuating means for actuating said first link relative to said second link upon receiving a signal from said tactile sensor.

10. The combination defined by claim 9 in which said actuator means comprises a motor and said coupling means comprises a gear and pinion arrangement.

11. The combination defined by claim 9 in which said actuator means comprises a reversible motor, said coupling means comprises a rack and pinion gear arrangement, and a closed-looped electrical circuitry associated with said sensor and said motor for controlling the actuation of said first link by said actuator while said actuator means being responsive to said tactile sensor when pressure is applied to said sensor.

12. The combination defined by claim 9 including operator-operative means for selectively overriding the electrical control of the actuator means by the tactile sensor and cause said actuator means to actuate said first link relative to said second link in a predetermined sense.

13. A semiautomatic mechanical hand comprising a frame having a plurality of interconnected hinged linked skeleton structures, each structure including an end link, an intermediate link, and an inner link, each link having an outer and an inner end, each inner link being pivotally connected at its inner end to said skeleton structures by a first pivotal joint connection, each inner link being pivotally connected at its outer end to an inner end of an associated intermediate link by a second pivotal joint connection, each intermediate link being pivotally connected at its outer end to an inner end of an associated end link by a third pivotal joint connection, polyethylene material housing said structure, a tactile sensor operably supported at each outer end of said links, individual motor means connected at said intermediate link and associated with the sensor of the end link, individual motor means connected to said inner link and associated with the sensor of the intermediate link, and individual motor means connected within said skeleton structure and associated with the sensor of the inner link, rack and pinion gear means connecting each motor means with each of the links supporting their associated sensors for driving said last mentioned links, and a closed loop electrical circuitry operably connecting said sensors with said motor means for energizing said motor means for actuating the links in one direction for simulating the closing of the hand and for actuating the same in another direction for simulating the opening of the hand.

14. The structure of claim 13 wherein said closed loop electrical circuitry comprises a constant current power supply having an output controlled by said tactile sensor for directing current to said motor means, a differential amplifier connected to the output of said constant current power supply controlled by said sensor, and a servo amplifier connected to an output of said differential amplifier for driving said motor means.

15. The combination defined by claim 14 including operator-operative means for selectively applying an electrical control signal to an input of the differential amplifier for effecting energization of the motor means in a sense for actuating the links in said other direction for simulating the opening of the hand.

(References on following page)

References Cited

UNITED STATES PATENTS

| | | | |
|---|---|---|---|
| 2,567,066 | 9/1951 | Goldman | 3—12.7 XR |
| 2,582,234 | 1/1952 | Conzelman et al. | 3—12.4 |
| 2,656,545 | 10/1953 | Conzelman et al. | 3—12 |
| 2,842,774 | 7/1958 | Vitt | 3—1.1 |
| 2,885,686 | 5/1959 | Giaimo | 3—1.1 |
| 3,263,824 | 8/1966 | Jones et al. | 214—1 |

FOREIGN PATENTS

| | | |
|---|---|---|
| 297,320 | 4/1917 | Germany. |

OTHER REFERENCES

"Electronics in Prosthetics" in Proceedings of the IRE, September 1962, p. 2005.

"An Adaptive Artificial Hand," by R. Tomovic et al. IRE Transactions on Automatic Control, vol. AC-7, No. 3, April 1962, pp. 3-10.

RICHARD A. GAUDET, Primary Examiner

R. L. FRINKS, Assistant Examiner

U.S. Cl. X.R.

3—12.7; 214—1